US009613335B2

(12) United States Patent
Grissom et al.

(10) Patent No.: US 9,613,335 B2
(45) Date of Patent: Apr. 4, 2017

(54) SYSTEM AND METHODS FOR AUTOMATIC REORGANIZATION OF PICK SLOT ASSIGNMENTS IN A WAREHOUSE

(71) Applicants: Charles Ray Grissom, Raleigh, NC (US); Daniel Basmajian, Chapel Hill, NC (US)

(72) Inventors: Charles Ray Grissom, Raleigh, NC (US); Daniel Basmajian, Chapel Hill, NC (US)

(73) Assignee: OPTRICITY CORPORATION, Research Triangle Park, NC (US)

( * ) Notice: Subject to any disclaimer, the term of this patent is extended or adjusted under 35 U.S.C. 154(b) by 0 days.

(21) Appl. No.: 14/560,594

(22) Filed: Dec. 4, 2014

(65) Prior Publication Data

US 2015/0262118 A1 Sep. 17, 2015

Related U.S. Application Data

(60) Provisional application No. 61/952,617, filed on Mar. 13, 2014.

(51) Int. Cl.
*G06Q 10/08* (2012.01)
*G06Q 10/06* (2012.01)

(52) U.S. Cl.
CPC ..... *G06Q 10/087* (2013.01); *G06Q 10/06315* (2013.01); *G06Q 10/08* (2013.01)

(58) Field of Classification Search
CPC . G06Q 10/087; G06Q 10/06315; G06Q 10/08
See application file for complete search history.

(56) References Cited

U.S. PATENT DOCUMENTS

| | | | | |
|---|---|---|---|---|
| 7,669,763 B2* | 3/2010 | Ernesti | ............... | G06Q 10/087 235/383 |
| 7,770,792 B2* | 8/2010 | Bruns | ................ | G06Q 10/08 235/383 |
| 7,885,865 B2* | 2/2011 | Benson | ............. | G06Q 10/0637 705/28 |
| 8,234,004 B2* | 7/2012 | Grissom | ............. | G06Q 10/087 235/385 |
| 8,244,603 B1* | 8/2012 | Tang | ................. | G06Q 10/0633 414/222.07 |

(Continued)

*Primary Examiner* — Thomas Randazzo
(74) *Attorney, Agent, or Firm* — Hultquist, PLLC; Peter H. Priest

(57) ABSTRACT

Systems and methods for automatic reorganization of pick slot assignments in a warehouse are described. Replenishments of products from storage slots to pick slots are used to perform product relocation to new pick slots for active items, along with traditional relocation moves for inactive items to establish open pick slots. By use of replenishments, the blocking of product relocations to new pick slots due to order picking activity is reduced or eliminated, enabling product relocation for improved slotting to be performed during normal warehouse operations. A dynamic slotting method is described where each item is assigned to a zone having a designated set of slots and each item is replenished to any new slot, as compared to an originally assigned slot, in the zone as stock is depleted by picking. Inactive items may be proactively relocated to temporary slots to reduce or eliminate the blocking of relocations of active items.

20 Claims, 9 Drawing Sheets

(56) References Cited

U.S. PATENT DOCUMENTS

| | | | | |
|---|---|---|---|---|
| 8,321,302 B2* | 11/2012 | Bauer | .................. | G06K 7/0008 |
| | | | | 705/22 |
| 8,594,835 B2* | 11/2013 | Lert | ....................... | B65G 1/045 |
| | | | | 414/267 |
| 8,954,188 B2* | 2/2015 | Sullivan | ................. | G06Q 10/08 |
| | | | | 414/273 |
| 2010/0108760 A1* | 5/2010 | Eccleston | ............ | G06Q 10/087 |
| | | | | 235/385 |
| 2010/0218131 A1* | 8/2010 | Holm-Petersen | .... | G06Q 10/087 |
| | | | | 715/771 |
| 2011/0200420 A1* | 8/2011 | Driskill | ................ | G06Q 10/087 |
| | | | | 414/807 |
| 2013/0310967 A1* | 11/2013 | Olson | .................. | G06Q 10/087 |
| | | | | 700/214 |
| 2014/0100769 A1* | 4/2014 | Wurman | .............. | G06Q 10/087 |
| | | | | 701/301 |
| 2014/0277691 A1* | 9/2014 | Jacobus | ............... | G06Q 10/087 |
| | | | | 700/216 |
| 2014/0344118 A1* | 11/2014 | Parpia | .................. | G06Q 10/087 |
| | | | | 705/28 |

\* cited by examiner

SYSTEM AND METHODS FOR AUTOMATIC REORGANIZATION OF PICK SLOT ASSIGNMENTS IN A WAREHOUSE

The present application claims the benefit of U.S. Provisional Application Ser. No. 61/952,617 entitled "A System and Method for Automatic Reorganization of Pick Slot Assignments in a Warehouse" filed Mar. 13, 2014 which is assigned to the assignee hereof and hereby incorporated by reference herein in its entirety.

CROSS REFERENCE TO RELATED APPLICATION

The patent application entitled "Systems and Methods for Efficiently Determining Item Slot Assignments", U.S. application Ser. No. 12/392,182 filed on Feb. 25, 2009 now U.S. Pat. No. 8,234,004 and the patent application entitled "Methods for Assigning Items to Slots for Efficient Access of the Items for Storage and Delivery", U.S. application Ser. No. 13/772,649 filed on Feb. 21, 2013, both have the same assignee as the present application, are related applications, and are hereby incorporated by reference in their entirety.

FIELD OF THE DISCLOSURE

The present disclosure relates generally to the field of computerized placement and organization of items in a warehouse and more specifically to approaches for automatically reorganizing pick slot assignments in a warehouse.

BACKGROUND

Many products, such as food related products, beauty and fashion items, home, hardware and repair supplies, automobile related products, electronic products, such as televisions, radios, cell phones, personal computers (PCs), games and packaged PC software, and the like, after manufacturing, are generally moved to a distribution center or warehouse. A distribution center controls the flow of the various products from receiving to storage to shipping. For example, products are received in the warehouse and moved to storage locations termed slots, and selected products are then moved from their slots to placement in shipping containers to be sent to marketing endpoints, such as grocery stores, department stores, and the like. It can be appreciated that a haphazard method of storing products in a warehouse can lead to high costs due to inefficiencies in locating and moving the products. Further complicating the flow of products in a warehouse, is the varying demand for each product, such as experienced from an initial product introduction, through promotional and seasonal demands, to phase-out of the product. A produces distribution cost is overhead that reduces profits and increases the price consumers must pay for the product.

A physical warehouse is generally built with shelf racks in various configurations with each shelf containing labeled locations, called slots, for item storage. Slots in a warehouse may also be identified by marking locations on a floor, radio frequency identification (RFID) tags, barcodes, a combination of such identifiers or otherwise. Operations performed in a warehouse include, for example, assigning items to slots, storing items from a receiving dock into assigned slots, and retrieving items from assigned slots and transporting them to a transport dock. Warehouse slotting systems generally exist to guide users as to where to place items in a warehouse.

In an active warehouse, it is difficult to relocate items to different slots that are more optimum for accessing ordered items due to the items being actively picked from currently assigned slots. Also, changing item characteristics and slotting rules require that slot assignments change frequently. Changing slot assignments usually involves, among other things, relocating active items that are currently in the process of being picked for shipment, and inactive items, which are rarely picked and therefore occupy slots for long periods of time.

SUMMARY

Among its several aspects, the present disclosure recognizes that more efficient methods are required for automatically reorganizing pick slot assignments in a warehouse. To such ends, an embodiment of the invention addresses a computer based method for using replenishments to perform product relocation to new preferred slots in a warehouse. A warehouse management control (WMC) function obtains lists of items, currently empty slots, a current assignment of items to slots, and a slotting map that lists preferred slot assignments for all listed items. The current assignment of items to slots is compared with the slotting map and with the list of currently empty slots to determine whether there is at least one currently empty slot that is a preferred slot having an item assigned to it in the slotting map, wherein the item is currently assigned to an original slot. A replenishment command is sent to the WMC function to direct new inventory for the item to the at least one empty slot that is the preferred slot to replenish the item relocated to the preferred slot.

Another embodiment addresses a computer based method for reducing blockage of product relocation to new pick slots in a warehouse. A warehouse management control (WMC) function is queried to find an inactive item that is not allocated to current outstanding pick orders and that occupies a slot that is needed for a different preferred item according to a slotting map. A command is sent to the WMC function to remove inventory for the inactive item from the slot, and relocate the inventory to a temporary empty slot. Replenishments are used in the WMC function to perform product relocation of new inventory for the preferred item to the slot as assigned in the slotting map.

Another embodiment addresses a computer based method for proactively relocating inactive items in a dynamic slotting environment to minimize blocking of required slots for items in a zone. A warehouse management control (WMC) function is queried for a list of one or more items currently slotted into a first zone different than an assigned zone that is assigned to the listed items in a slotting map, wherein the listed items are inactive items that are not being picked in a current pick cycle. A command is sent to the WMC function to relocate stock for an inactive item of the listed items to an available slot in the assigned zone. The sending step is repeated until each of the inactive items are relocated to the assigned zone, wherein blocking of required slots for items in a zone is minimized.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Product flow in a typical distribution center warehouse is largely driven by replenishment of product from bulk storage slots to pick slots for order picking. Existing slotting systems and processes generally require product relocation for slotting to be performed such that items may be temporarily unavailable for order picking, due to being removed from current slots and transferred to newly assigned slots. Also, some existing systems only relocate items when slots are empty, and inactive items can block that process of selecting and transferring items for long periods of time.

For example, items cannot be relocated from a current pick slot due to orders, based on lists of items to be picked, which contain those items and are in the process of being picked, or are already scheduled to be picked. Slotting moves in general are dependent on other slotting moves. For example, moving an item to a new slot requires that slot to be empty, which may require a prior move to empty the slot. It is generally difficult to perform slotting moves during active picking operations. In some cases, it is possible to interleave slotting moves with picking activity, but often many slotting moves are blocked by items that have been allocated to orders to be picked. Many previous systems depend on off-picking periods to perform item slot relocations or use interleaving methods. In other systems, product relocation to new slots can be blocked due to order picking activity, or due to inactive items that occupy slots for long periods of time before stock is depleted.

The systems and methods described herein use replenishments to perform product relocation to new pick slots for active items, and proactive relocation moves for inactive items. These approaches reduce or eliminate the blocking of product relocation to new pick slots due to order picking activity, enabling product relocation for improved slotting to be performed during normal warehouse operations. In addition, the systems and methods described herein may advantageously include processes to proactively relocate inactive items that may block the relocation of active items.

Figure 1A:
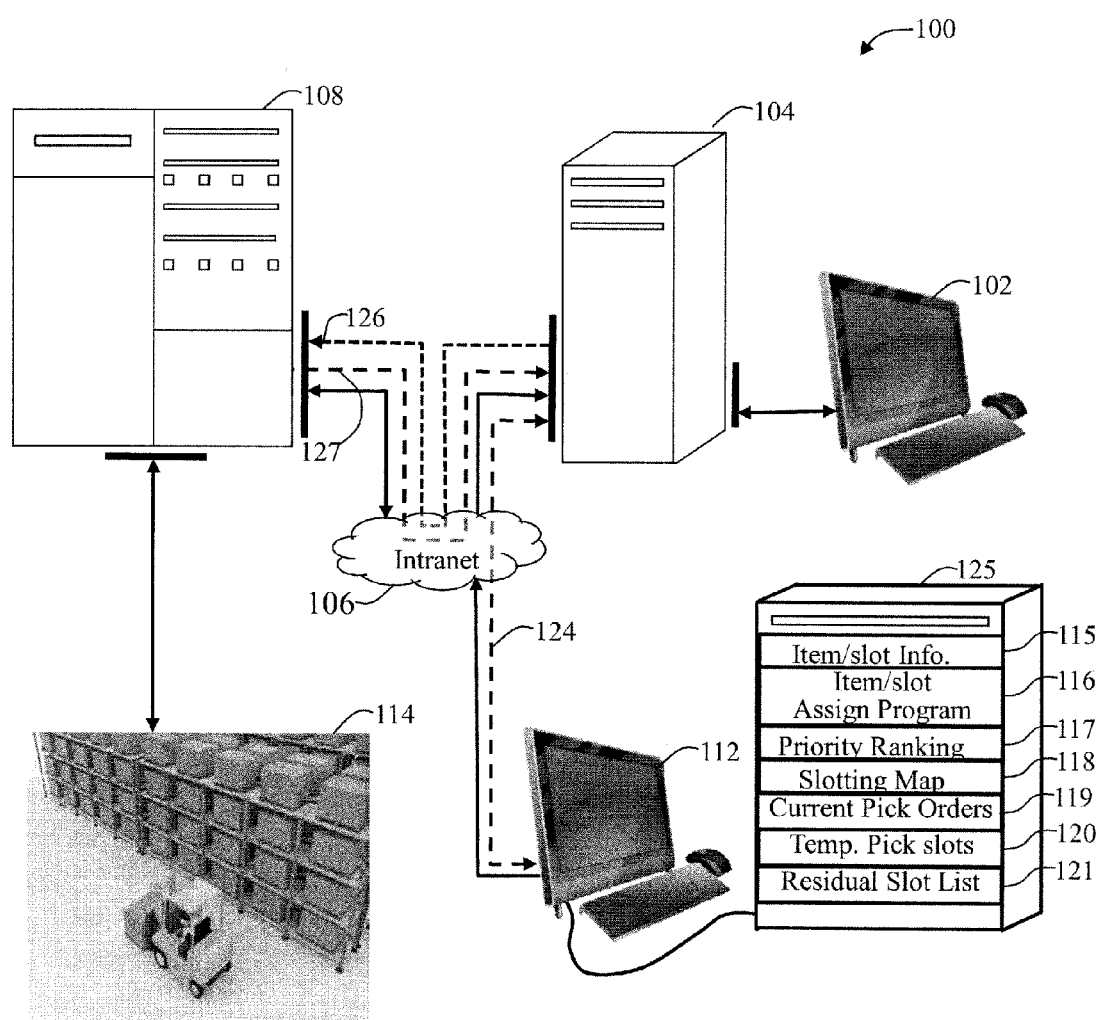
FIG. 1A illustrates a system for automatic reorganization of pick slot assignments in a warehouse in which embodiments of the invention may be advantageously employed.

FIG. 1A illustrates a system 100 for automatic reorganization of pick slot assignments in a warehouse in which embodiments of the invention may be advantageously employed. The system 100 comprises a re-slotting server terminal 102, a re-slotting server 104, an intranet communications network 106, a warehouse management system (WMS) 108, and a slot computing device 112, for example to be used in a warehouse 114 including warehouse racking arrangement 140 shown in FIG. 1B. The system 100 directs the placing of items in slots, such as slot 142, and the distribution of the items selected from slots to fill orders. The slot computing device 112 comprises a central processing core, storage 125, and interface connections to the intranet 106, through a standard interface such as a universal serial bus (USB), Ethernet connections, or a wireless interface. The slot computing device 112 also includes a display, such as a monitor or touch screen, a keyboard and mouse, separate or integrated in the device, and a printer or access to a remote printer by means of the intranet 106 or wireless connections for example.

The slot computing device 112 stores programs and information in storage 125 which includes, for example, items, slots, zones, and item-slot pairing (item/slot) information 115, an item slot assignment program 116, priority ranking information 117, a slotting map 118, a list of current pick orders 119, a list of temporary pick slots 120, and a residual slot list 121. The specified data and programs 115-121 may be instantiated on the re-slotting server 104 and the WMS server 108 over the intranet 106, for example, depending on different system and warehouse requirements. The item/slot information 115 lists items and slots that are paired in a manner that best utilizes available space in the slots and also adheres to any constraints that may exist for the slots. For example, there are typically size, weight, and other item and slot constraints which must be satisfied in order to pair an item to a particular slot. An item slot assignment program 116 is a program for automatic reorganization of pick slot assignments in a warehouse and is loaded on the slot computing device 112. In another embodiment, the slot assignment program may be loaded on a WMS, such as WMS 108, in a warehouse system having a WMS as a single computing device in the warehouse.

The priority ranking information 117 is based on constraints which, for example, include, but are not limited to: (1) defined areas or groups of slots that admit only a specified group of items, such as a fireproof area designed for flammable items; (2) slots that admit only a prescribed group of items due to physical position, such as a slot that does not allow heavy or fragile items due to height above the floor; (3) defined areas or groups of slots that admit only a prescribed group of items due to temperature, such as a freezer area; (4) defined types or sizes of slots that admit only a prescribed group of items due to velocity limits, such as roller flow slots that are used for faster moving shipping items; (5) defined areas or groups of slots reserved only for items of a certain characteristic, such as an area of slots designed for toxic items; or (6) more generally any defined area or group of slots or defined type or size of slot that is reserved for items with a specified characteristic. The priority information 117 may also include an ordered sequence of assigning items to slots under constraints such as those listed above. The slotting map 118 includes an assignment of items to pick slots. The current pick orders 119 are orders having lists of items to be picked and shipped for the current or upcoming work shift. The temporary pick slots 120 are slots that are not normally used for storage, but are available to be used for temporary relocations of items in order to stage them for permanent relocation to new slots at a later time. The residual slot list 121 is a list of slots that still contain inventory for items that have been relocated to new pick slots. In normal situations, these residual slots will be depleted of inventory during normal picking, and will become empty and available for new items to be slotted there.

The warehouse management system 108 updates warehouse information, such as the items, slots, zones, and item-slot pairing (item/slot) information, which may be downloaded to the slot computing device 112 over the intranet 106 and stored on the slot computing device 112 as item/slot information 115. The item and slot pairing data may be converted to a list of item to slot assignments and translated to program steps in a language such as C, C++, JAVA®, FORTRAN, COBOL, machine assembly language, and the like, that controls robotic devices, such as a robotic controlled forklift truck 150 of FIG. 1C for example, associated with the warehouse 114. It is noted that in an alternative embodiment, the warehouse management system (WMS) 108 may be located remotely from the warehouse 114 and connected to the slot computing device 112 through an Internet 106 connection. The slot computing device 112 is configured to generate the slotting map 118 and to send the slotting map 118 to the re-slotting server 104. While the slot computing device 112 is shown as a desktop system, embodiments of the invention may be suitably employed in any appropriately configured device, such as a server, a laptop computer, a tablet computer, or a smart phone, for example. The re-slotting server 104 and the WMS server 108 each comprise a central processing core, storage, and interface connections to the intranet 106, through a standard interface such as a universal serial bus (USB), Ethernet connections, or a wireless interface. A WMS generally controls a warehouse's inventory and handles transactions against that inventory, such as removal for picking, and for shipping or addition for replenishment or receipt. When inventory comes into the warehouse, considered a receipt of the inventory, the inventory is generally slotted into bulk reserve slots, but sometimes it is slotted directly into pick slots. A warehouse control system (WCS) generally controls hardware in a warehouse in real time, such as conveyors, diverters, and the like. More recent WMSs include some hardware control, while some recent WCSs include some inventory control. A single server providing the management control function may also be labeled a combined WMS/WCS server. The programs and data configured on the slot computing device 112 may also be installed on the WMS 108.

Figure 1B:
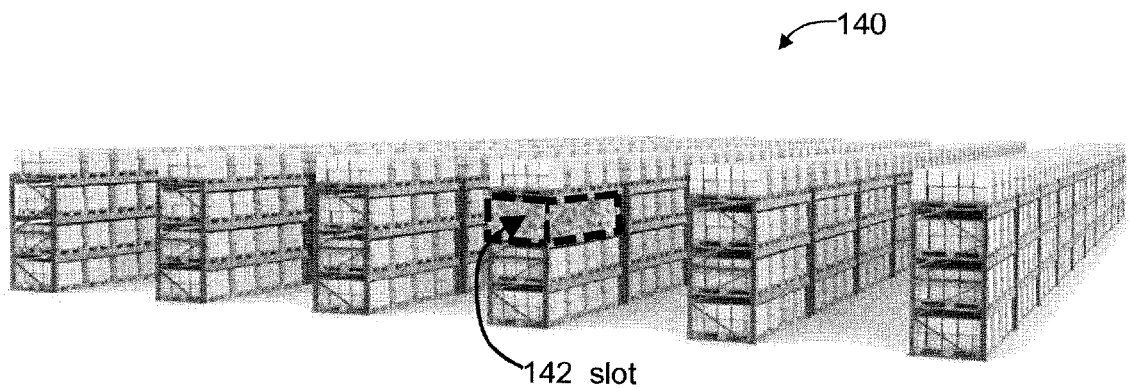
FIG. 1B illustrates a warehouse racking arrangement showing items slotted on pallets.
Figure 1C:
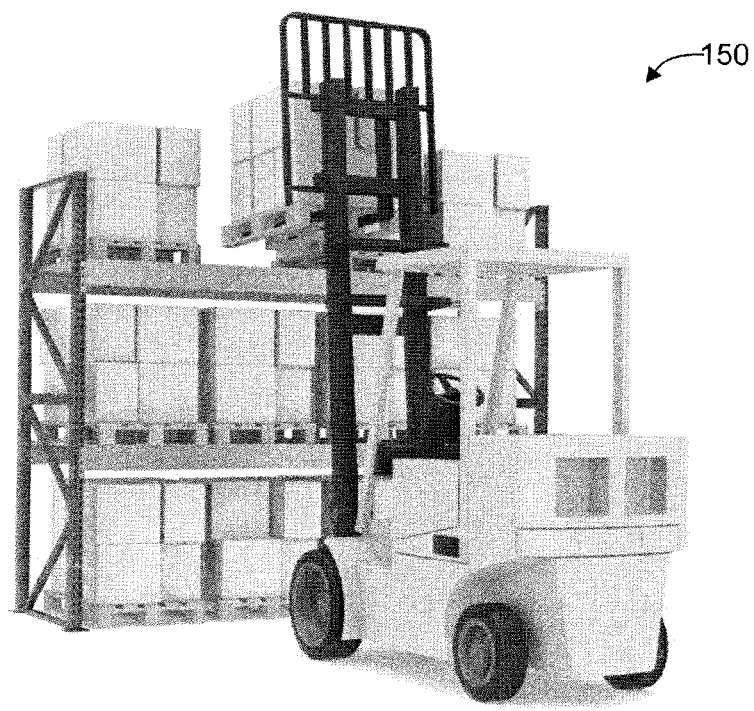
FIG. 1C illustrates an exemplary slotting of an item using a robotic controlled forklift truck.

The embodiments of the present invention may be programmed in a slot computing device, such as the slot computing device 112 of FIG. 1A, a desk top, a laptop, a tablet, a smart phone, or the like to accept an input list of items, warehouse slot storage locations, such as associated with the racking arrangement 140 of FIG. 1B, and rules or criteria for item and slot sequencing and their associated constraints, and produce a list of item to slot assignments, such that this list can be used to perform the physical storage of items to slots in a physical warehouse. The list of item to slot assignments may be translated to program steps in a language that controls robotic devices, such as the robotic controlled forklift truck 150 of FIG. 1C for example, associated with the physical warehouse. It is noted that a robotic forklift may also be human controlled and the list of item to slot assignments may also be translated to a human readable list for manual placement of items. A computer program process, also referred to as a software process herein, provides a compare operation that compares current slotting assignments of product to pick slots to the assignments in a slotting map and uses current outstanding picking orders to determine which replenishment commands or proactive product relocation commands can be executed without disrupting picking operations. The compare operation, also described at step 248 of FIG. 2B, is a comparison of two lists, to filter out the items that may be operated on without disruption. By comparing a list of items that will be picked during the current pick cycle to a list of all items in the warehouse or in a partition of the warehouse, a determination is made as to which items, if any, can be relocated without disrupting pick operations. Among those items that are not part of the current pick cycle, a determination is made whether any of those items should be relocated to currently empty slots via a replenishment operation. Depending on the capabilities of the WMS, it may be possible to replenish an item to a new empty slot even if it is being picked in the current cycle, as long as the inventory for the item in its current slot is not disturbed. Since picking operations are dynamic, the replenishments and the proactive product relocations that can be executed at any given time are constantly changing. The processes described herein execute subroutines to make these determinations and send the appropriate commands on an ongoing basis, as needed, or at frequent time intervals.

A user of the automatic reorganization system loads a slotting map into a slot computing device 112, such as a laptop, desktop, tablet, or other such computing device, or configures software on the slot computing device 112 to load the slotting map automatically at specified time intervals. The user also configures user-settable parameters that determine priority of items for reassignment and configures the software to communicate with and send commands to the WMS or WCS. The user may also configure the frequency at which the software makes replenishments and proactive product relocations, such as in an ongoing manner or at fixed time intervals, and then executes the software to perform its work automatically until stopped by the user or other such authorized person.

A warehouse is usually built with shelf racks, such as the racking arrangement 140 of FIG. 1B, in various configurations with each shelf containing labeled storage locations called slots, such as the slot 142 for example, for item storage. A warehouse is considered a temporary repository for item stock. Warehouses generally have multiple staging areas for each product as the products flow through the facility. Typically, a product is received into the warehouse and placed in bulk storage slots, or reserve storage, and then smaller quantities are placed into pick slots, where the product is then retrieved by pickers that are responding to orders that include lists of items and quantities for shipment out of the warehouse.

As product is picked from a pick slot, the pick slot becomes empty, or nearly empty, and then more products may be transferred from bulk storage to the pick slot to prepare for further picking. This transfer is called replenishment. A flow of product through a typical distribution center warehouse may be as follows:

1. A product is received into the warehouse, at an inbound shipping dock or door;
2. The received product is stored into one or more bulk reserve slots;
3. As needed, the product is transferred to a usually smaller pick slot, the transfer considered a replenishment;
4. The product is picked, in other words retrieved, from a pick slot either manually or by an automated machine;
5. The picked product is placed into a shipping carton or onto another device, such as a pallet; and
6. The shipping carton or pallet is transferred out of the warehouse through a shipping dock or door, usually to a shipping vehicle.

Based on characteristics of the products and slot locations, the assignment of items to pick slots can be done in such a way as to reduce the cost of picking and replenishment, or to improve the operations in other ways. This assignment is called slotting.

Generally, there are two primary methods of assigning items to slots. In the first method, called a fixed slot assignment method or a fixed slotting method, each item is designated a specific slot, or set of slots, and each item is always replenished to the same designated slot or set of slots as stock is depleted by picking. In the second method, called a dynamic slot assignment method or a dynamic slotting method, each item is assigned to a zone which is a designated set of slots, such as all slots in an aisle or a selected set of slots in a selected set of aisles may be specified as a zone, and each item is replenished to any slot in the zone as stock is depleted by picking.

Often in these two methods, slotting is done by considering properties, such as dimensions, velocity, product type, and the like of a particular item and a particular pick slot or pick slot type. The slotting process may also consider the properties of items in nearby pick slots or in the same zone.

A third approach considers all items and pick slots at once, to produce a global solution that assigns all items to pick slots in such a way as to reduce the total cost of operations in a warehouse to a minimal or minimized value, for example. The third approach may also provide other improvements besides direct costs, such as improved sequencing of items such that the shipping cartons or pallets are efficiently loaded. An assignment of items to pick slots is called a slotting map. There are commercially available slotting software products or warehouse management systems that perform a slotting optimization function and thereby produce slotting maps, and many distribution center operators use spreadsheets or other tools to produce slotting maps in a manual or computer-assisted fashion.

In the case of fixed slot assignments, the slotting map designates a particular slot or particular slots for each item. In the case of dynamic slot assignments, each item is assigned to a designated zone, rather than any particular slots. Generally, the current assignments of items to slots in a warehouse is considered a current slotting, and a plan to assign items to perhaps different slots in the future, using a slotting map, for example, as a target slotting. A mathematical process may be used to derive a minimal list of steps, or moves, to perform a relocation of items from the current slotting to the target slotting, and that list of steps is called a moves list. A moves list is a typical method of implementing item relocations to new pick slots. Also, the moves list does not consider the current status of the warehouse as compared to embodiments described herein which do consider the status of the warehouse. In various embodiments of this invention, the concept of a moves list is replaced with a real-time process that relocates items based on current warehouse status. As such, a moves list is not generated in any part of this process.

If a slotting map is produced, by any means, which includes an assignment of items to slots that is different than a current assignment, then in order to implement the new assignments of items to slots indicated by the slotting map, items must be relocated from their current pick slots to newly assigned pick slots. These product relocations are typically called 'moves' or 'slotting moves' and typically were listed in a moves list.

In contrast, embodiments of this invention use a computer driven process to utilize a natural replenishment which transfers product from bulk storage, or reserved storage to pick slots to perform the majority of slotting moves. Generally, in order to use a replenishment to relocate product to a new pick slot, that slot must already be empty, so there are several variations of the process depending on availability of empty slots at any given time.

A first type of replenishment process of a WMS is usually triggered by an indication of a 'nearly empty' slot, such as a slot having an inventory below a configured inventory threshold. This first type of replenishment process assumes the item remains assigned to the same slot. In various embodiments, a second type of replenishment process adds an additional step or steps to the first type of replenishment operation of the WMS to relocate an item to a new currently empty slot. In order to take over use of the first type of replenishment operation to relocate an item, the additional step or steps inform the WMS that a new assignment of the item to an empty slot has been made before inventory in the currently assigned slot is below the configured inventory threshold or at the time the indication of a 'nearly empty slot' is received. In response to receiving the new slot assignment information, the WMS finishes picking from the previously assigned slot to completely empty that slot and then the WMS is triggered to replenish the newly assigned slot with inventory for the relocated item. It is noted that by making the configured inventory threshold zero, only empty slots are selected. Also, in another embodiment, the capabilities of the re-slotting server 104 and the slot computing device 112 are all combined in the WMS 108 to more easily and quickly receive the 'nearly empty slot' indication in the WMS 108.

A multi-part control process is used which is implemented on a computer that has access to, or can be provided with, the prerequisite data listed as described herein. In most practical situations, this computer-driven process must communicate with a warehouse management system (WMS) or a warehouse control system (WCS) to obtain the listed prerequisite data and send commands for tasks such as replenishments, reassignment of items to pick slots, and slotting moves. In this case, the WMS or WCS would control the execution of the commands via a task queue, optionally reporting the success or failure of such tasks back to the multi-part control process. It is also possible for the commands that are output from this multi-part control process to be executed manually by warehouse personnel, and provide feedback, via data entry, to the multi-part control process for continuation. Another option is for this process to be integrated into and therefore be a component of, a WMS or WCS. Another important functionality of either the WMS or the WCS is their associated inventory control system. It is noted that the abbreviations WMS or the WMS/WCS may be used interchangeably herein to describe systems having the needed capabilities.

In an example scenario, the re-slotting server terminal 102 configures the re-slotting server 104. The slot computing device 112 generates a slotting plan in the form of a slotting map, for example, and sends the slotting map to the re-slotting server 104, for example over the intranet 106 employing path 124, for example. The re-slotting server 104 sends commands to the WMS 108 over the intranet 106 over path 126 and receives data responses from the WMS 108 over the intranet 106 employing path 127. The processes illustrated in FIGS. 2A-4B are executed in an ongoing manner or repeated at fixed time intervals. The goal of these processes is to relocate items from existing pick slots to new ones as specified in the slotting map using a replenishment process.

For example, in one embodiment, the WMS 108 is queried by the re-slotting server 104 for empty slots, and directed by the re-slotting server 104 according to the slotting map to relocate items to any currently empty slots that are assigned items in the slotting map, by a replenishment command. In a typical warehouse, the WMS has a minimum inventory threshold set for each item and its associated slot or slots, so that at any time that the inventory for that item falls below the inventory threshold, a replenishment command is auto-generated by the WMS software. In one or more embodiments of the present invention, the replenishment command is used in a new way, to redirect the replenishment to a new slot that is preferred for the item based on the slotting map, instead of merely restocking the current slot. In a sense, the auto-generation of the replenishment command that the WMS generates internally is taken over and used to relocate the item to a specified slot instead of restocking it into its currently assigned slot. Remaining inventory in the former slot for any such item is either moved to the new slot by an additional command generated internally to the WMS 108, or that inventory is depleted by continued order picking, also as determined internally to the WMS 108. In either case, the former slot for such an item becomes empty, and is then available for another item to be relocated. If no such empty slots exist, the processes in the re-slotting server 104 query the WMS 108 for inactive items that should be relocated according to the slotting map, and generates relocation commands to the WMS for those items, to assign and move them to temporary slots, in order to produce empty slots for the primary relocation process via replenishments to those empty slots. The items that are assigned to temporary slots will be naturally relocated to proper non-temporary slots at a time that the assigned slots for those items from the slotting map become available, as described above.

For example, in another embodiment, the function of the re-slotting server 104 and the function of the slot computing device 112 are combined in the WMS which is then referred as a WMS-Plus. The new WMS-Plus is informed by means of an internally generated slotting map that a new assignment of an item to an empty slot has been made before inventory in the currently assigned slot for the item is below the configured inventory threshold or at the time the indication of a 'nearly empty slot' is received. In response to receiving the new slot assignment information, the WMS-Plus finishes picking from the previously assigned slot to completely empty that slot and then the WMS-Plus is triggered to replenish the newly assigned slot with inventory for that relocated item, by using a WMS-Plus generated replenishment command, for example.

The slot computing device 112, which is used to generate or maintain the slotting map, can indeed be a portable device, so that an operator can physically examine the warehouse and make adjustments to the slotting map based on observations, or modify the rules used to generate the slotting map. Any such updates to the slotting map are then sent to this processes described herein, to modify the assignment of items to new slots accordingly.

Figure 2A:
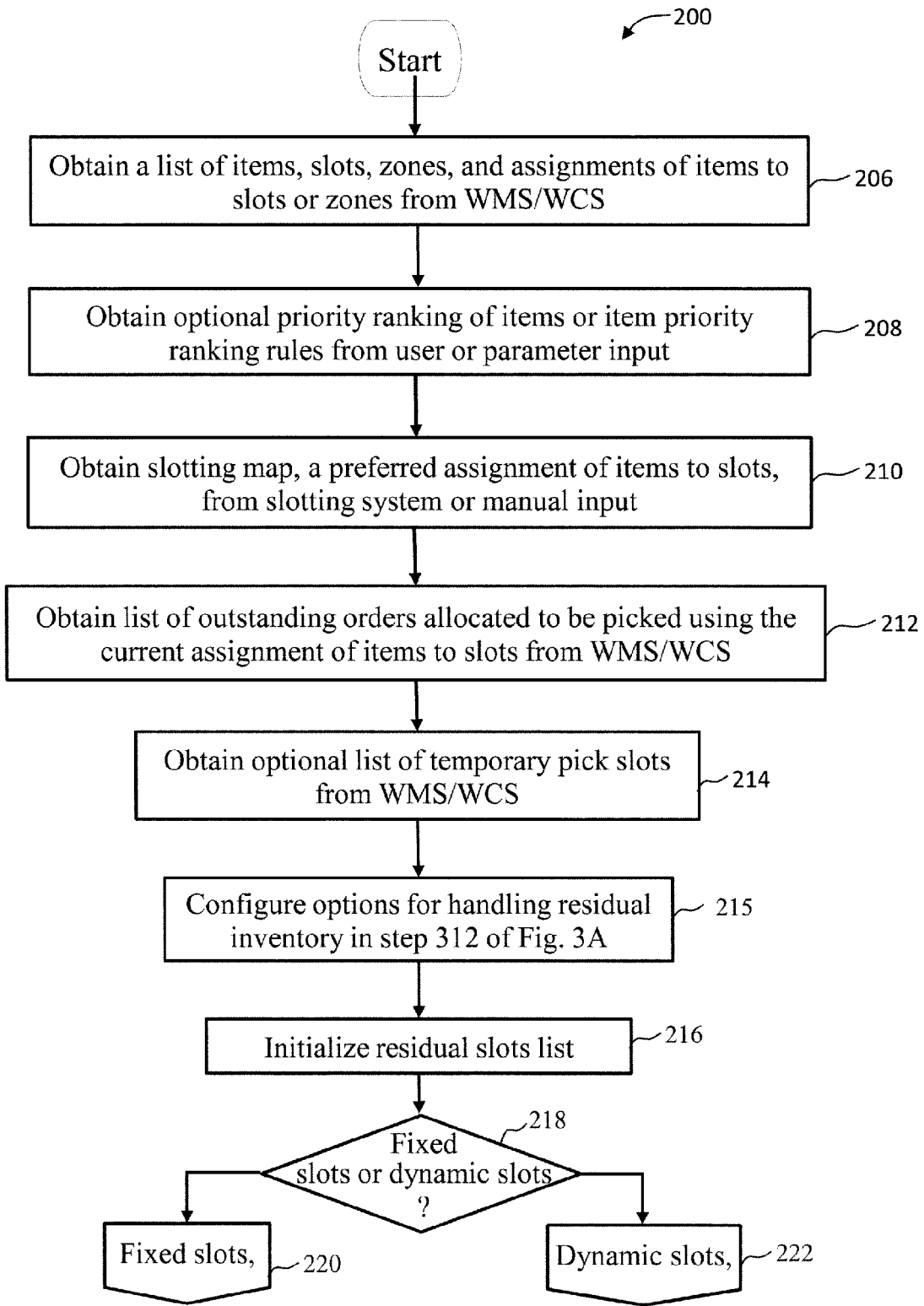
FIG. 2A illustrates an exemplary initialization process for access of required data and preparation of operational lists in accordance with the present invention.
Figure 2B:
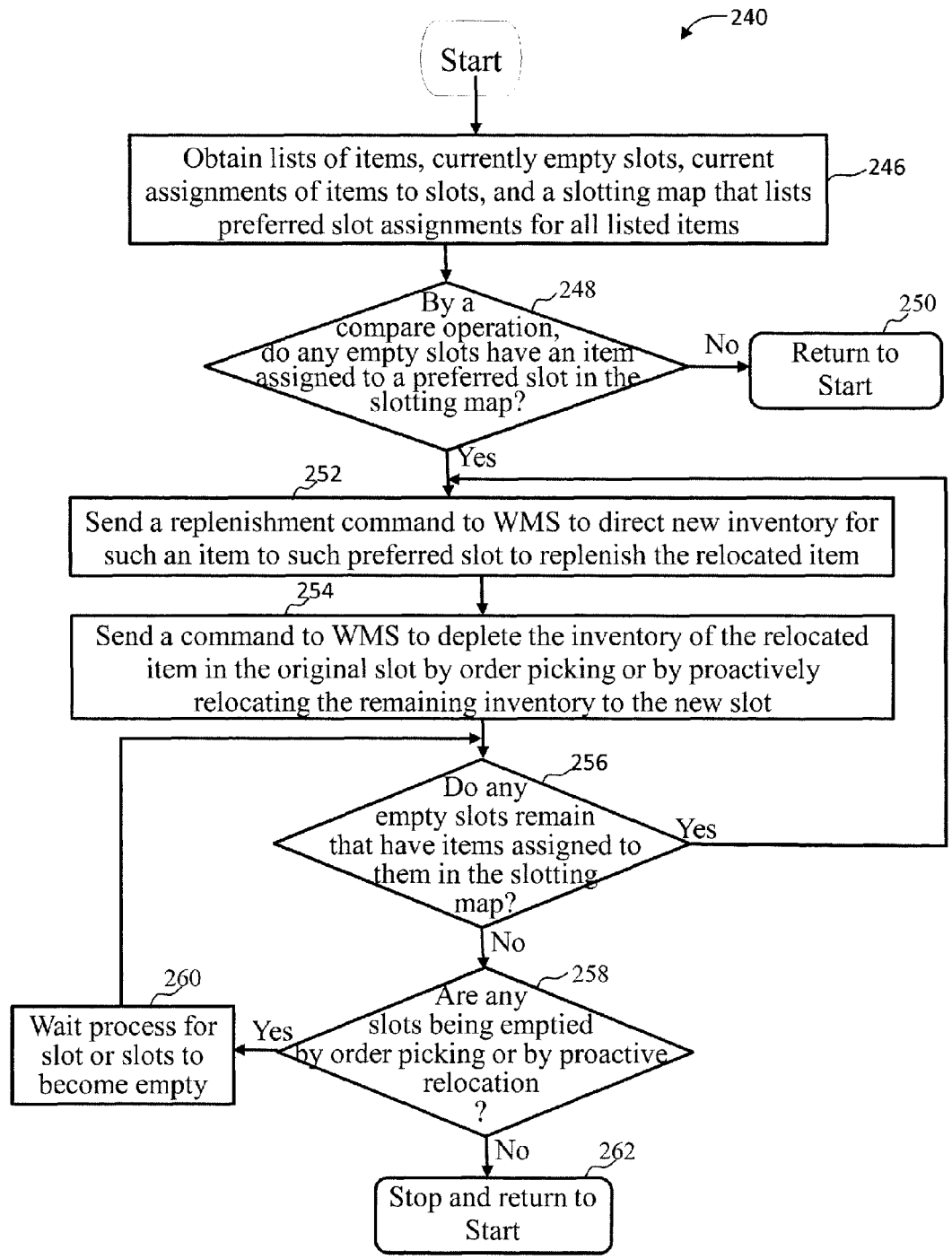
FIG. 2B illustrates an exemplary computer based process for using replenishments to perform product relocation to new preferred slots in a warehouse in accordance with the present invention.

FIG. 2A illustrates an exemplary initialization process 200 for access of required data and preparation of operational lists in accordance with the present invention. At step 206, a list of items, slots, zones, and assignments of items to slots or zones is obtained from the WMS/WCS 108 and stored in the slot computing device 112 as item/slot information 115. The data obtained from WMS/WCS 108, among other data, includes the current slotting, which is the current assignment of items to slots. At step 208, priority ranking of items or priority ranking rules may be optionally obtained from a user or a parameter input and stored in the slot computing device 112 as priority ranking 117. At step 210, a slotting map that is a preferred assignment of items to slots, is obtained from a slotting system or from a manual input and stored in the slot computing device 112 as slotting map 118. Preferred slots are based on slotting rules or goals for the facility, which are often based on improving productivity or use of space, among other things. For example, a very active item that is shipped frequently, for example, would be preferred to be slotted in a larger location nearer to the shipping dock, while an inactive item that is less frequently shipped would be preferred to be slotted into a smaller location that is in a less frequently visited aisle or area. Also in another example, slots would be preferred for groups of items that are related to each other to keep them near each other, such as product groups including food, paper, detergents, and other related items.

Returning to step 210, the slotting map, also called a target slotting, is produced. This slotting map is the preferred future assignment of items to slots. An item is considered properly slotted if it is currently assigned to a slot, or a plurality of slots, as specified in the target slotting, and only that slot, or one of the slots in the specified plurality of slots. At step 212, a list of outstanding orders allocated to be picked using the current assignment of items to slots is obtained from the WMS/WCS 108 and stored in the slot computing device 112 as current pick orders 119.

It is noted that generally, items are not relocatable if there are outstanding pick orders allocated to the items in their current slots, but any items that are not allocated to outstanding pick orders are relocatable. Generally a warehouse has far more items in pick slots than are allocated to orders at any given time. In addition, some WMSs allow an allocated item to be relocated to an additional slot while the original slot is depleted by picking. At step 214, a list of temporary pick slots may be optionally obtained from the WMS/WCS 108 and stored in the slot computing device 112 as temporary pick slots 120. Temporary pick slots are slots that are not currently used in the pick area and are not targeted for use in the pick area. These temporary slots must be available for temporarily assigning items such that they can be allocated to be picked for future orders. At step 215, a user makes choices for handling residual inventory that are employed in process 300 of FIG. 3A via a user interface, such as marking checkboxes displayed on the slot computing device 112, or by editing a configuration file. For example, for residual inventory of an item that has been relocated to a new slot a user may choose to continue to pick the item from the old slot until it is fully depleted and the old slot is empty, or the user may choose instead to move the residual inventory to a temporary slot where it can be picked to depletion, thereby freeing the old slot immediately for a new item as specified in the slotting map. At step 216, a residual slot list 121 is initialized on the slot computing device 112. Residual slots are defined to be slots that are currently occupied by an item, but those slots are not assigned to that item in the slotting map and that item in a residual slot currently has at least one proper slot assignment per the slotting map. Residual items are items that are assigned to residual slots.

At step 218, a determination is made whether there is to be a fixed slot assignment or a dynamic slot assignment. If the determination is to have the fixed slot assignment, the initialization process 200 proceeds to a fixed slots connector block 220 to FIG. 3A. In the case of fixed slots, each item is designated a specific slot, or set of specific slots, and each item is replenished to the same slot or the same slots as stock is depleted by picking. If the determination is to have dynamic slot assignment, the initialization process 200 proceeds to dynamic slots connector block 222 to FIG. 4A. In the case of dynamic slots, each item is assigned to a zone, a designated set or collection of slots, such as slots in an aisle or set of aisle and each item is replenished to any slot in the zone as stock is depleted by picking. Some WMSs only allow items to be assigned to specific slots, indicated as a fixed slot assignment, while some WMSs allow items to be given zone assignments, and the WMS can randomly assign an item a slot in its designated zone at any given time.

FIG. 2B illustrates an exemplary computer based process 240 for using replenishments to perform product relocation to new preferred slots in a warehouse in accordance with the present invention. A slotting map is the preferred future assignment of items to slots. Beginning at step 246, lists of items, currently empty slots, current assignments of items to slots, and a slotting map are obtained. The slotting map lists preferred slot assignments for all listed items. At step 248, a determination is made whether any empty slots have an item assigned to a preferred slot in the slotting map. For example, such a determination may be made by comparing the current assignment of items to slots with the slotting map and with the list of currently empty slots to determine whether there is at least one currently empty slot that is a preferred slot having an item assigned to it in the slotting map, wherein the item is currently assigned to an original slot. If there are no such empty slots, the process 240 proceeds to connector block 250 and returns to the starting point of this process 240 in operation.

Returning to step 248, if there is an empty slot or empty slots that have an item assigned to a preferred slot in the slotting map, the process 240 proceeds to step 252. At step 252, a replenishment command is sent to a warehouse management system (WMS) to direct new inventory for such an item to be delivered to such a preferred slot to replenish the relocated item. At step 254, a command is sent to the WMS to deplete the inventory of the relocated item in the original slot by order picking or by proactively relocating the remaining inventory to the new slot. At step 256, a determination is made whether any empty slots remain that have items assigned to them in the slotting map. If any empty slots are found that have items assigned to them in the slotting map, the process 240 returns to step 252 to process the newly found empty slot or slots. If any empty slots are not found at step 256, the process 240 proceeds to step 258.

At step 258, a determination is made whether any slots are being emptied by order picking or by proactive relocation. If any slots are found that are being emptied by order picking or by proactive relocation, the process proceeds to step 260. At step 260, a wait process is initiated for the slot or slots to become empty. For example, a waiting process can be implemented that pauses the present process 240 while the slot or slots are being emptied and then returns to the step 256. When the slot or slots are emptied, a notification of the emptying event is prepared and forwarded as required or the WMS may use a polling process to determine the slot or slots have been emptied. After such notification, a return to step 256 may be made to determine if any of the newly emptied slots have items assigned to them in the slotting map and continue their processing. Returning to step 258, if no slots are being emptied, then the process 240 proceeds to step 262. At step 262, the process 240 stops and then a return is made to the starting point of this process 240. The process 240 works for each individual item on an as need be basis and covers hundreds or thousands of items as may be found in a warehouse, such that many of these steps are taken in parallel.

Figure 3A:
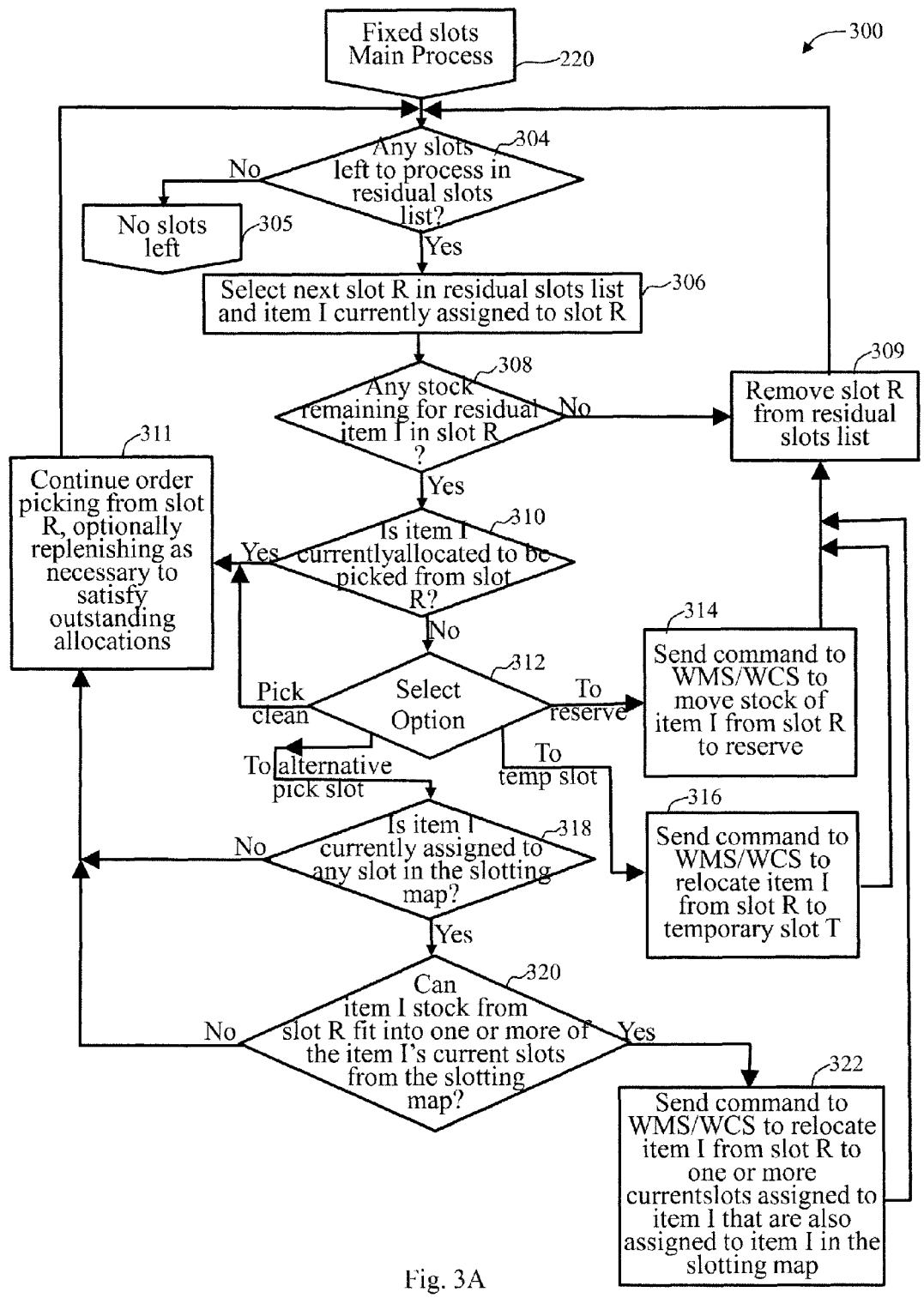
FIG. 3A illustrates a first sub-process for a system with at least one currently empty slot providing an exemplary fixed slot automatic reorganization function in accordance with the present invention.
Figure 3B:
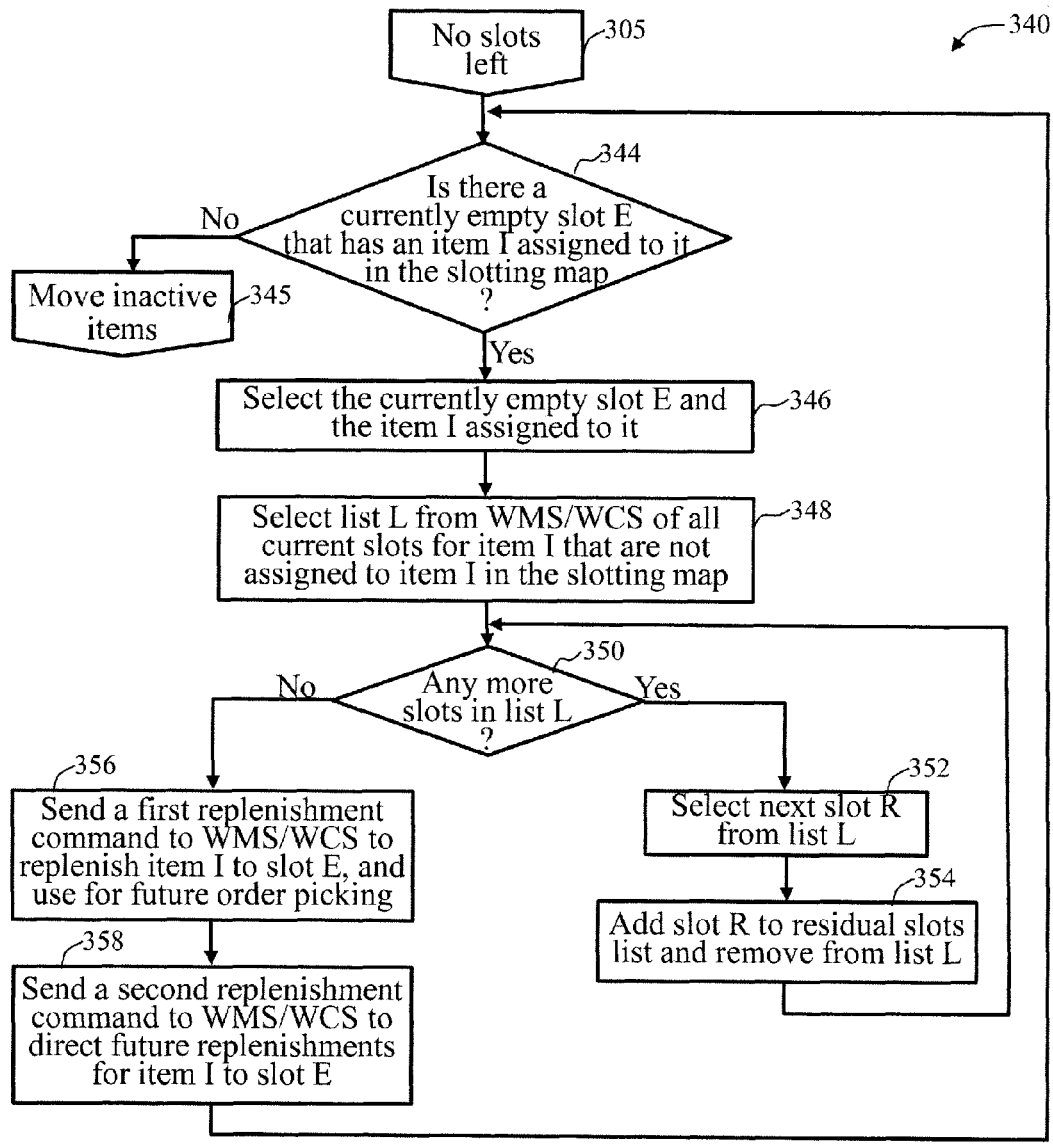
FIG. 3B illustrates a second sub-process for a system with at least one currently empty slot providing the exemplary fixed slot automatic reorganization function in accordance with the present invention.
Figure 3C:
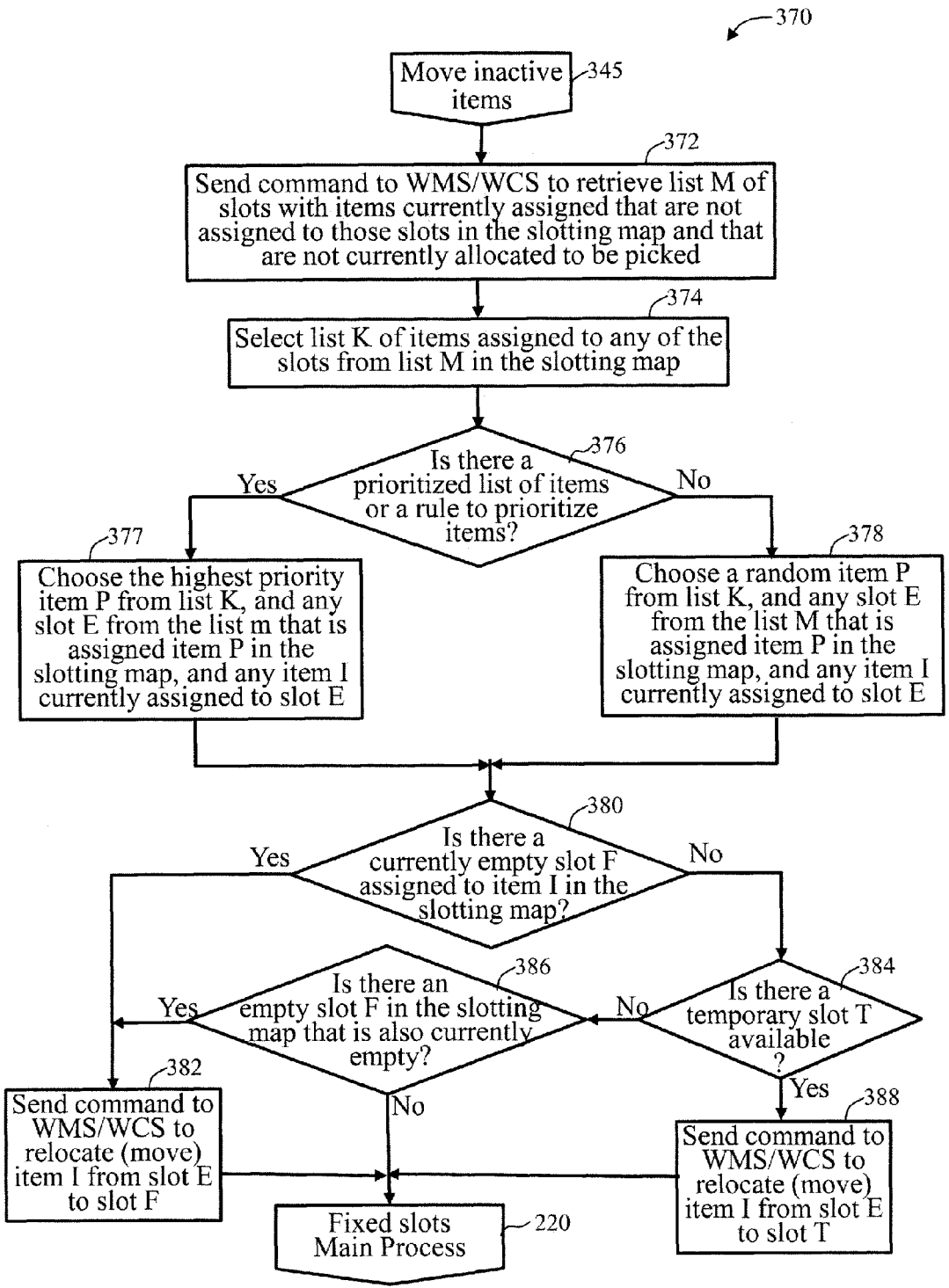
FIG. 3C illustrates a third sub-process for a system with no currently empty slot that has an item assigned to it in the slotting map included in the exemplary fixed slot automatic reorganization function in accordance with the present invention.

There are two basic parts to the three sub-processes shown in FIGS. 3A-3C, with the first part comprising FIGS. 3A and 3B and the second part comprising FIG. 3C. In the first sub-process 300 starting at step 304 of FIG. 3A, residual inventory is processed as indicated in the residual slots list obtained at step 216 of FIG. 2A and including items that have been relocated to new slots by the second sub-process 340 of FIG. 3B. In the second sub-process 340 starting at step 344 of FIG. 3B, the WMS is commanded at steps 356 and 358, to replenish an item to a currently empty slot by referring to the slotting map. In the third sub-process 370 of FIG. 3C, 'inactive items' are proactively relocated as described in more detail below. Generally, a replenishment done to relocate an item, as described in the second sub-process 340 of FIG. 3B, results in residual inventory to be handled by the first sub-process 300 of FIG. 3A. The residual inventory is leftover inventory for the item in its 'old' slot. The second sub-process 340 begins at step 344 after the residual slots are processed. At that point, either there are empty slots that can be used for replenishment relocations, or there are not. If there are no empty slots, then the process proceeds to connector block 345 to FIG. 3C, which may also include a short wait to allow for conditions to adjust. The sub-processes of FIGS. 3A-3C are applied to one or more individual items on an as need be basis and cover hundreds or thousands of items as may be found in a warehouse, such that many of these steps taken in parallel.

Regarding the sub-processes 300 of FIG. 3A and 340 of FIG. 3B, if any slot is currently empty, and the slotting map has an item assigned to that slot, then:

1. Designate current slots for the item that are not assigned to that item in the slotting map as residual slots.

2. Trigger a replenishment, by sending a command to the WMS or WCS, directed to the selected empty slot to stock that slot with the designated item.
3. Designate the selected slot for future replenishments.
4. Allocate any future orders for the item to be picked from the new selected slot and/or current slots that are also assigned to this item in the slotting map, instead of the residual slots, except in case of optional step 5c below.
5. When all current allocations, if any, for the item from the residual slots are completed, perform one of the following: (a) initiate a slotting move to relocate the remaining stock, if any, to the new slot or other slots currently assigned to that item that are also in the slotting map if there is room, (b) transfer the remaining residual stock back to bulk reserve storage, or (c) allow the remaining residual stock to be picked to fulfill future orders until the slot is empty, or until the prior options (5a) or (5b) apply.
6. The residual slot or slots are now empty, so reapply the sub-processes 300 of FIG. 3A and 340 of FIG. 3B if possible; otherwise apply the sub-process 370 of FIG. 3C.

FIG. 3A illustrates the first sub-process 300 for a system with at least one currently empty slot providing an exemplary fixed slot automatic reorganization function in accordance with the present invention. FIG. 3B illustrates a second sub-process 340 for a system with at least one currently empty slot providing the exemplary fixed slot automatic reorganization function in accordance with the present invention. The sub-process 300 operates on a residual slots list having a goal of emptying residual slots to make space for items to be relocated to those slots as specified in a slotting map. Beginning at the fixed slots connector block 220 at the top of FIG. 3A, the sub-process 300 proceeds to step 304. At step 304, a determination is made whether there are any slots left to process in a residual slots list. If the determination is that there are not any slots left to process in the residual slots list, the sub-process 300 proceeds to the connector block 345 to FIG. 3B, to be described in more detail below. If the determination is that there are slots left to process in the residual slots list, the sub-process 300 proceeds to step 306. At step 306, a next slot R in the residual slots list and an item I currently assigned to slot R are selected. Item I is considered a residual item located in a residual slot R. At step 308, a determination is made whether any stock remains for the residual item I in slot R. If there is not any more stock available for the residual item I, the sub-process 300 proceeds to step 309. At step 309, the slot R is removed from the residual slots list and the sub-process 300 returns to step 304.

Returning to step 308, if there is more stock available for the residual item I, the sub-process 300 proceeds to step 310. At step 310, a determination is made whether item I is currently allocated to be picked from slot R. If item I is currently allocated to be picked from slot R, the sub-process 300 proceeds to step 311. At step 311, order picking from slot R is continued with an optional replenishing as necessary to satisfy outstanding allocations. The sub-process 300 then returns to step 304.

Returning to step 310, if item I is not currently allocated to be picked from slot R, the sub-process 300 proceeds to step 312. At step 312, a select option determination is made. For example, the sub-process 300 may select a pick clean path that proceeds to step 311, a reserve path that proceeds to step 314, a temp slot path that proceeds to step 316, or an alternative pick slot path that proceeds to step 318. The option selected in step 312 is usually determined either by WMS limitations in functionality or by policy of the warehouse. A configuration of the sub-process 300 is required to select the option in step 312 that will be chosen every time this loop executes. Configuration of the sub-process 300 means a user makes choices that affect this sub-process 300 via a user interface, such as marking checkboxes, or by editing a configuration file. This sub-process handles residual inventory as defined above. For example, the user makes choices such that residual inventory for an item that has been relocated to a new slot should be handled by continuing to pick the item from the old slot until it is fully depleted and the old slot is empty, or by choosing to move the residual inventory to a temporary slot where it can be picked to depletion, thereby freeing the old slot immediately for a new item as specified in the slotting map, among others, as used by the decision point 312 from FIG. 3A. These settings automatically choose the path through the process, where there are selections to be made. These selections, as described below, are made once, before the sub-process 300 is started, such as at step 215 of FIG. 2A, and then are applied every time the sub-process 300 loops. If the pick clean path that proceeds to step 311 is selected, order picking from slot R is continued at step 311 with an optional replenishing as necessary to satisfy outstanding allocations. The sub-process 300 then returns to step 304. If the reserve path that proceeds to step 314 is selected, a command is sent to WMS/WCS 108 at step 314 to move stock of item I from slot R to a reserve slot. The sub-process 300 then returns to step 304. If the temp slot path that proceeds to step 316 is selected, a command is sent to WMS/WCS 108 at step 316 to relocate item I from slot R to temporary slot T1. The sub-process 300 then returns to step 304. If the alternative pick slot path that proceeds to step 318 is selected, the sub-process 300 proceeds to step 318. At step 318, a determination is made whether item I is currently assigned to any slot in the slotting map. If item I is not currently assigned to any slot in the slotting map, the sub-process 300 proceeds to step 311. At step 311, order picking from slot R is continued with an optional replenishing as necessary to satisfy outstanding allocations. The sub-process 300 then returns to step 304.

Returning to step 318, if item I is currently assigned to any slot in the slotting map, the sub-process 300 proceeds to step 320. At step 320, a determination is made whether item I stock from slot R fits into one or more of the item I's current slots from the slotting map. If item I stock from slot R cannot fit into one or more of the item I's current slots from the slotting map, the sub-process 300 proceeds to step 311. At step 311, order picking from slot R is continued with an optional replenishing as necessary to satisfy outstanding allocations. The sub-process 300 then returns to step 304. At step 320, if item I stock from slot R can fit into one or more of the item I's current slots from the slotting map, the sub-process 300 proceeds to step 322. At step 322, a command is sent to WMS/WCS 108 to relocate item I from slot R to one or more current slots assigned to item I that are also assigned to item I in the slotting map. The sub-process 300 then returns to step 304.

FIG. 3B illustrates a second sub-process 340 for a system with at least one currently empty slot providing the exemplary fixed slot automatic reorganization function in accordance with the present invention. There are two possible paths shown in FIG. 3B, one to connector block 345 to FIG. 3C and one to step 346. If there are no currently empty slots that can be used for a replenishment relocation, determined at step 344, the sub-process 340 proceeds to the connector block 345 to FIG. 3C which takes over to find, if possible, an 'inactive item' that can be proactively removed from its current slot, in order to leave a new empty slot. The 'inactive item' is chosen to proactively relocate so that the slot becomes empty and thus the newly emptied slot would be used for an item that needs that slot according to the slotting map. The 'inactive item' is placed into a temporary slot. This temporary placement frees up the newly emptied slot which is determined to meet the requirements at step 344 and the sub-process 340 would then proceed to step 346.

The sub-process 340 examines empty slots with a goal of relocating an item by means of a replenishment source based on the slotting map. Beginning at the no slots left connector block 305 at the top of FIG. 3B, the sub-process 340 proceeds to step 344. At step 344, a determination is made whether there is a currently empty slot E that has an item I assigned to it in the slotting map. If the determination indicates that there is no currently empty slot E having the listed requirements, the sub-process 340 proceeds to connector block 345 to FIG. 3C, to be described in more detail below. It is noted that if there are outstanding orders such that the currently empty slot will have to be replenished to satisfy those outstanding allocations, then the current slot is either added to a residual slots list for continued picking with replenishments as described herein or the current slot is maintained with normal replenishments until the outstanding orders are processed.

Returning to step 344, if the determination indicates that there is a currently empty slot E having the listed requirements, the sub-process 340 proceeds to step 346. At step 346, the currently empty slot E and the item I assigned to it are selected. At step 348, a list L is selected from the WMS/WCS 108, the list L having a list of current slots for item I that are not assigned to item I in the slotting map. At step 350, a determination is made whether there are any more slots listed in the list L. If there are more slots listed in the list L, the sub-process 340 proceeds to step 352. At step 352, a next slot R is selected from the list L. At step 354, the selected next slot R is added to a residual slots list and removed from the list L. The sub-process 340 then returns to step 350 to check for more slots to be processed from the list L. It is possible that there may be additional slots currently assigned to the chosen item I that are not assigned to it in the slotting map. All of these additional slots are then considered 'residual' slots, in that these additional slots hold residual inventory for item I that must be cleared out. This clearing out of the residual slots is handled by the sub-process 300 beginning at step 304 of FIG. 3A. The loop in FIG. 3B, consisting of steps 350, 352, and 354, checks for those residual slots and adds them to the list to be processed beginning at step 304.

At step 350, if the determination finds that there are not any further slots in the list L to be processed, the sub-process 340 proceeds to step 356. At step 356, a first replenishment command is sent to the WMS/WCS 108 to replenish item I to slot E and identify the replenished item I in slot E for future order picking. At step 358, a second replenishment command is sent to the WMS/WCS 108 to direct future replenishments for item I to slot E. The sub-process 340 then returns to step 344 to determine if there is another currently empty slot E that has an item I assigned to it in the slotting map. Each time through the main loop of the sub-process 340, the currently empty slot E is a new empty slot and the item assigned to that slot is generally not the same as for the previously selected item I. The decision at step 344 is based on whether there exists a currently empty slot that has an item I assigned to that slot in the slotting map. The currently empty slots are determined by querying the WMS. Any such empty slots are compared to the slotting map to find one, if any, that has an item assigned in the slotting map. If there are more than one such slot and item, then any one such slot and item can be chosen at random.

FIG. 3C illustrates an exemplary fixed slot automatic reorganization sub-process 370 for a system with no currently empty slot that has an item assigned to it in the slotting map included in the exemplary fixed slot automatic reorganization function in accordance with the present invention. In the sub-process 370, if there are no current empty slots that have items assigned to them in the slotting map, then:

1. From among all items that have no current order allocations, which are considered inactive items, select an item occupying a slot that has the highest priority item assigned to it in the slotting map, if a priority ranking was obtained at step 208 of FIG. 2A. If no priority ranking for items exists, then randomly choose any inactive item which is an item with no current or outstanding order allocation.
2. Initiate a slotting move that reassigns the selected item from its current slot or slots to the selected item's assigned slot or slots in the slotting map, if any such slot exists and is empty; otherwise initiate a slotting move to relocate the selected item to the nearest empty slot or slots in the slotting map or to the slot or slots that item is assigned to in the slotting map. If no such empty slot exists, then initiate a slotting move to relocate the item to one or more temporary slots. If no such temporary slot exists, reapply the sub-process 370 with the next highest priority inactive item to be relocated, or with any random inactive item.
3. Apply the process shown in FIGS. 3A and 3B to the slot or slots just emptied by the slotting move in 2 immediately above.

In FIG. 3C, beginning at the connector block 345 at the top of FIG. 3C, the sub-process 370 proceeds to step 372. At step 372, a command is sent to the WMS/WCS 108 to retrieve a list M of slots with items currently assigned that are not assigned to those slots in the slotting map and that are not currently allocated to be picked. These items are currently inactive items that are not slotted properly according to the slotting map. The goal of the sub-process 370 is to relocate these inactive items, where possible, to free up slots allowing active items to be relocated to the freed up slots by means of a replenishment. At step 374, a list K is selected having a listing of items assigned to any of the slots from the list M in the slotting map. The items on the list K are items that are currently allocated to be picked and are targeted to be placed in slots that are currently occupied by inactive items based on the target slotting. At step 376, a determination is made whether there is a prioritized list of items or a rule to prioritize the items obtained from step 208 of FIG. 2A. If the determination indicates that there is a prioritized list of items or a rule to prioritize the items, the sub-process 370 proceeds to step 377. At step 377, the highest priority item P is chosen from the list K. Also, any slot E is chosen from the list M, wherein the chosen slot E is to be assigned the item P according to the slotting map. Further, any item I is chosen that is currently assigned to slot E. Returning to step 376, if the determination indicates that there is no prioritized list of items or no rule to prioritize the items, the sub-process 370 proceeds to step 378. At step 378, a random item P is chosen from the list K. Also, any slot E is chosen from the list M, wherein the chosen slot E is to be assigned the item P according to the slotting map. Further, any item I is chosen that is currently assigned to slot E.

At step 380, a determination is made whether there is a currently empty slot F assigned to item I in the slotting map. If there is a currently empty slot F assigned to item I in the slotting map, then the sub-process 370 proceeds to step 382. At step 382, a command is sent to the WMS/WCS 108 to relocate, or move, the item I from slot E to slot F. The sub-process 370 then proceeds to the fixed slots connector block 220 to FIG. 3A.

Returning to step 380, if no currently empty slot F assigned to item I in the slotting map can be found, the sub-process 370 proceeds to step 384. At step 384, a determination is made whether there is a temporary slot T available. If a temporary slot T is available, the sub-process 370 proceeds to step 388. At step 388, a command is sent to the WMS/WCS 108 to relocate, or move, item I from the slot E to the temporary slot T. Returning to step 384, if a temporary slot T is not available, the sub-process 370 proceeds to step 386.

At step 386, a determination is made whether the slotting map indicates an empty slot F in the slotting map that is also currently empty in the warehouse. If there is an empty slot F in the slotting map that is also currently empty, the sub-process 370 proceeds to step 382. At step 382, a command is sent to the WMS/WCS 108 to relocate, or move, the item I from slot E to slot F. The sub-process 370 then proceeds to the fixed slots connector block 220 to FIG. 3A. If no empty slot F can be found in the slotting map that is also currently empty at step 386, the sub-process 370 proceeds to the fixed slots connector block 220 of FIG. 3A.

Figure 4A:
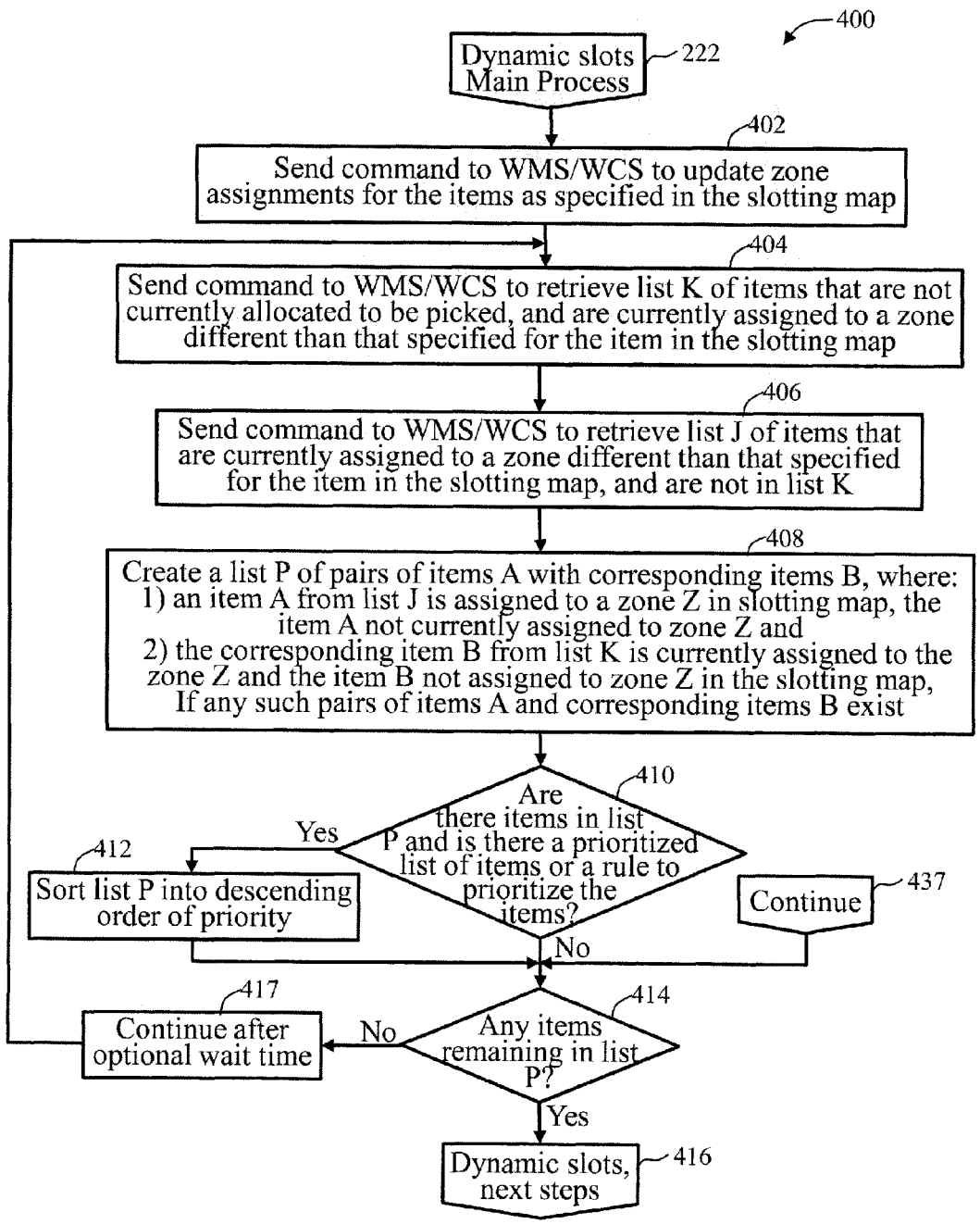
FIG. 4A illustrates an exemplary first process of a dynamic slot automatic reorganization function in accordance with the present invention.
Figure 4B:
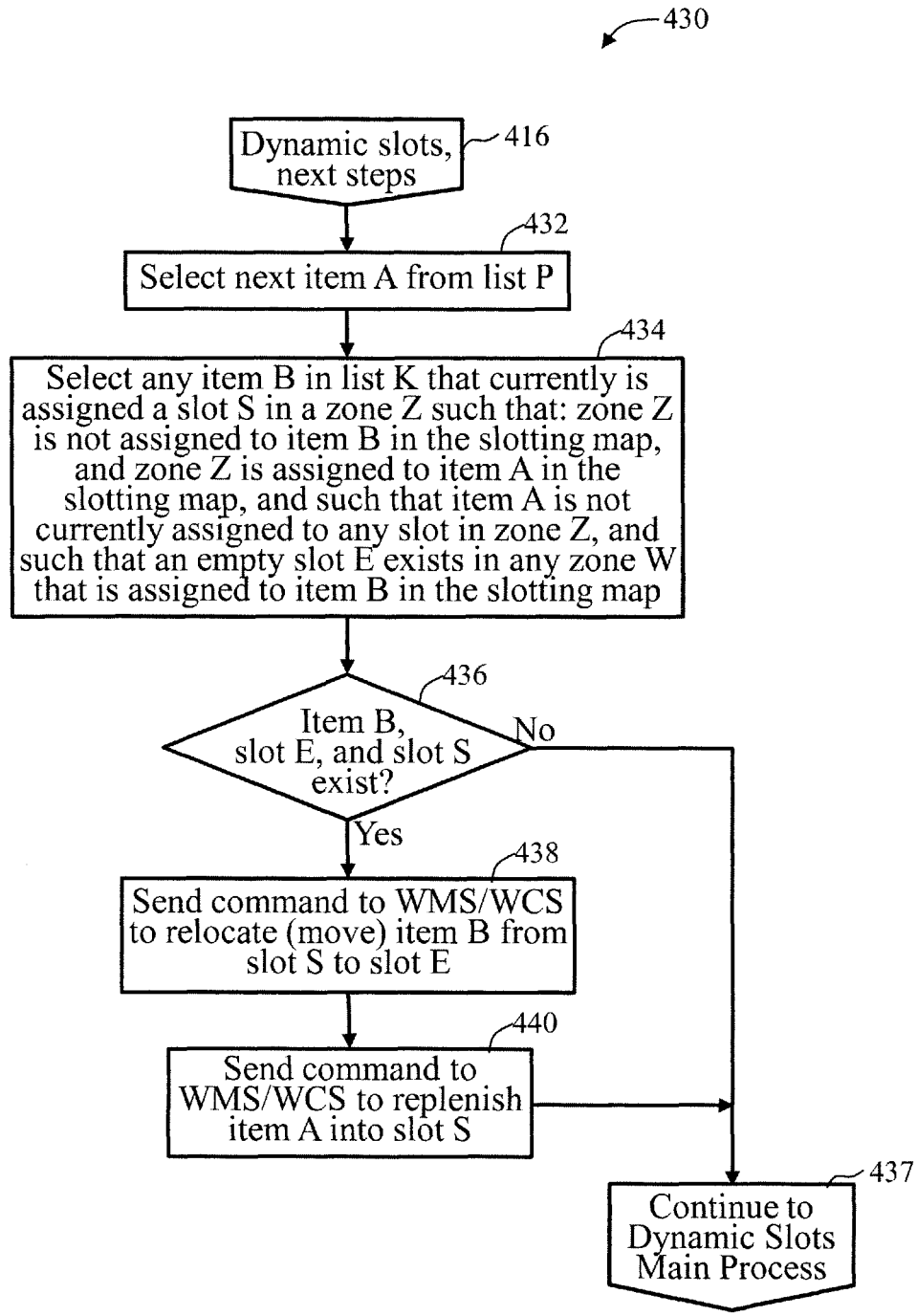
FIG. 4B illustrates an exemplary second process of the dynamic slot automatic reorganization function in accordance with the present invention.

FIG. 4A illustrates an exemplary first process 400 of a dynamic slot automatic reorganization function in accordance with the present invention. FIG. 4B illustrates an exemplary second process 430 of the dynamic slot automatic reorganization function in accordance with the present invention. The first process 400 of FIG. 4A and the second process 430 of FIG. 4B, cause items to be replenished to a correct zone or zones as stock is depleted. The processes of FIGS. 4A and 4B are applied to one or more individual items on an as need be basis and cover hundreds or thousands of items as may be found in a warehouse, such that many of these steps taken in parallel.

In a first part of the dynamic slot assignment function:
1. Update the zone assignments for each item to the zone assignments in the slotting map.
2. Replenishments are automatically generated by the WMS or WCS to restock items into empty slots in the correct zone as assigned, so no additional process is required here.

In a second part of the dynamic slot assignment function:
1. From among all items that have no current order allocations, which are considered inactive items, select any random item occupying any slots in a zone other than the slot or slots assigned to this item in the slotting map.
2. If the item does not already occupy one or more slots in the assigned zone, initiate a slotting move that relocates the selected item from its current out-of-assigned-zone slot or slots to empty slots in it's assigned zone or zones in the slotting map, if any such slots exist. If the item is already occupying one or more slots in the assigned zone and no empty slots exist in the assigned zone, then initiate a slotting move to return the stock in the incorrect zone to bulk reserve storage, if possible. Otherwise, continue with step 1 of the second part of the dynamic slot assignment function immediately above.

Beginning at the dynamic slots connector block 222 at the top of FIG. 4A, the process 400 proceeds to step 402. At step 402, a command is sent to the WMS/WCS 108 to update zone assignments for the items as specified in the slotting map. At step 404, a command is sent to the WMS/WCS 108 to retrieve the list K of items that are not currently allocated to be picked and are currently assigned to a zone different than that specified for the item in the slotting map. At step 406, a command is sent to the WMS/WCS 108 to retrieve a list J of items that are currently assigned to a zone different than that specified for the item in the slotting map and are not in the list K.

In operation, there is a list of active items A that need to be moved to a new zone Z via a replenishment command, as described herein, so as not to impact currently allocated orders for A, and corresponding inactive items B that need to be moved out of zone Z to make room for the replenishment of the items A to the new zone. The items A are active items that need to be moved, and the items B are inactive items that are in the way. The process 400 of FIG. 4A checks for pairs A and B so that the items A can proactively be moved to the new zone. Thus, at step 408, a list P is created having one or more pairs of items A from the list J for which there is also a corresponding item B in the list K, where an item A from list J is assigned to a zone Z in the slotting map, the item A not currently assigned to zone Z and the corresponding item B from list K is currently assigned to the zone Z, the item B not assigned to zone Z in the slotting map, if any such pairs of items A and items B exists. At step 410, a determination is made whether there are items in list P and is a prioritized list of items or a rule to prioritize the items obtained from step 208 of FIG. 2A. If there is a prioritized list of items or a rule to prioritize the items, the process 400 proceeds to step 412. At step 412, the list P is sorted into descending order of priority. At step 414, a determination is made whether there are any items remaining in the list P. If there are no remaining items in the list P, the process 400 proceeds to step 404. Since conditions in the warehouse are always changing, there will be times when something has changed, for example usually an item that was allocated to be picked has completed the pick, and is now unallocated. At step 417, the process 400 continues to step 404 after an optional wait time to allow additional time for a change that affects steps in the process 400. If there are items remaining in the list P, the process 400 proceeds to the dynamic slots next steps connector block 416 to FIG. 4B.

FIG. 4B illustrates an exemplary second process 430 of the dynamic slot automatic reorganization function in accordance with the present invention. Beginning at the dynamic slots next steps connector block 416 at the top of FIG. 4B, the process 430 proceeds to step 432. At step 432, a next item A is selected from the list P. At step 434, any item B in list K is selected that currently is assigned a slot S in a zone Z such that: zone Z is not assigned to item B in the slotting map, and zone Z is assigned to item A in the slotting map, and such that item A is not currently assigned to any slot in zone Z, and such that an empty slot E exists in any zone W that is assigned to item B in the slotting map. At step 436, a determination is made whether the item B, slot E, and slot S exist. If such item and slots do not exist, the process 430 proceeds to the continue connector block 437 to FIG. 4A. If such item and slots exist, the process 430 proceeds to step 438. At step 438, a command is sent to the WMS/WCS 108 to relocate, or move, the item B from slot S to slot E. At step 440, a command is sent to the WMS/WCS 108 to replenish item A into slot S. The command at step 440 is the same as the first replenishment command used at step 356, except that at step 440 the replenishment command, while considered similar to a natural replenishment command, operates differently in that it is directed to a specific slot. This approach is taken since in a dynamic slotting facility items are normally replenished into empty slots instead of the current slot. In comparison to the fixed slotting approach, at step 356, the natural replenishment directed to the current slot is taken over and redirected to an empty slot, which is inconsistent with the natural replenishment operation found in a typical warehouse. The process 430 then proceeds to the continue connector block 437 to FIG. 4A. In FIG. 4A, the process 400 proceeds from the continue connector block 437 to step 414 of FIG. 4A and continues as described above.

Computer program code or "program code" for being operated upon or for carrying out operations according to the teachings of the invention may be initially written in a high level programming language such as C, C++, JAVA®, FORTRAN, COBOL, Smalltalk, JavaScript®, Visual Basic®, TSQL, Perl, or in various other programming languages. A program written in one of these languages is compiled to a selected processor architecture by converting the high level program code into a native assembler program. Programs for the selected processor architecture may also be written directly in the native assembler language. A native assembler program uses instruction mnemonic representations of machine level binary instructions specified in a native instruction format, such as a 32-bit native instruction format. Program code or computer readable non-transitory medium as used herein refers to machine language code such as object code whose format is understandable by a processor.

A computer such as the slot computing device 112 of FIG. 1A, for example, may be configured to execute a program stored as non-transitory signals on a computer readable storage medium either directly associated locally with the processor, such as may be available through a local storage medium or may be accessible through the Internet or an intranet 106, for example, from a remote server system. The methods described in connection with the embodiments disclosed herein may be embodied in a computer system using software accessed from a memory module that stores non-transitory signals executed by the processor. The software module may reside in random access memory (RAM), flash memory, read only memory (ROM), electrically programmable read only memory (EPROM), hard disk, a removable disk, tape, compact disk read only memory (CD-ROM), or any other form of non-transitory storage medium known the art. A non-transitory storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using down loading techniques.

While the invention is disclosed in the context of illustrative embodiments for use in warehouses or distribution centers it will be recognized that a wide variety of implementations may be employed by persons of ordinary skill in the art consistent with the above discussion and the claims which follow below. In one example implementation, the various processes may be scripted into a general purpose calculation program, such as a spreadsheet program. In another embodiment, a computer program is written in a common programming language, such as FORTAN, C/C++, Java, etc., and operates continuously such that the program queries the WMS system for item and slot data, and sends commands back to the WMS to modify its operation. Another embodiment adds computer code directly to a WMS system to perform the processes described herein.

What is claimed is:

1. A computer based method for using replenishments to perform product relocation to new preferred slots in a warehouse, the method comprising:
    obtaining from a warehouse management control (WMC) server lists of items, currently empty slots, a current assignment of items to original slots, and a slotting map that lists preferred slot assignments for all listed items, wherein a slot is a physical storage location in the warehouse;
    comparing the current assignment of items to original slots with the slotting map and with the list of currently empty slots to determine whether there is at least one currently empty slot that is a preferred slot having an item assigned to it in the slotting map, wherein an inventory of the item is currently assigned to and located in an original slot;
    sending a replenishment command to the WMC server to replenish the item in the at least one empty slot that is the preferred slot for the item in the slotting map; and
    picking inventory remaining in the original slot without replenishment of the inventory of the item in the original slot.

2. The computer based method of claim 1, wherein the step of sending a replenishment command further comprises:
    determining when an inventory of the item in the preferred slot drops below a specified threshold; and
    directing new inventory for the item to the preferred slot.

3. The computer based method of claim 1 further comprising:
    picking the inventory of the item in the original slot until the original slot is empty.

4. The computer based method of claim 3, wherein the picking from the inventory of the item in the original slot further comprises:
    sending a command to the WMC server to initiate said picking.

5. The computer based method of claim 1 further comprising:
    sending a command to the WMC server to complete any picking step and proactively relocate any remaining inventory of the item to the preferred slot.

6. The computer based method of claim 1 further comprising:
    determining that a second empty slot exits that is a second preferred slot having a second item assigned to it in the slotting map, wherein the second item is currently assigned to a second original slot; and
    sending a second replenishment command to the WMC server to replenish the second item in the second preferred slot for the second item.

7. The computer based method of claim 3 further comprising:
    determining that the original slot is empty;
    determining whether the original slot is a second preferred slot having a second item assigned to it in the slotting map, wherein the second item is currently assigned to a second original slot; and
    if the original slot is a second preferred slot, then sending a second replenishment command to the WMC server to replenish the second item in the second preferred slot.

8. The computer based method of claim 1, wherein inventory to replenish the item is obtained from a reserve storage slot.

9. A computer based method for reducing blockage of product relocation to new pick slots in a warehouse, the method comprising:
- querying a warehouse management control (WMC) server to find an inactive item that is not allocated to current outstanding pick orders and that occupies a slot that is needed for a different preferred item according to a slotting map, that lists preferred slot assignments for items, wherein a slot in the slotting map is a physical storage location in the warehouse;
- sending a command to the WMC server to remove inventory for the inactive item from the slot, and relocate the inventory to a temporary empty slot; and
- using replenishments generated by the WMC server to perform product relocation of new inventory for the preferred item to the slot as assigned in the slotting map.

10. The computer based method of claim 9 further comprising:
- querying a warehouse management control (WMC) server to find a second inactive item that is not allocated to current outstanding pick orders and that occupies a second slot that is needed for a different second preferred item according to a slotting map;
- sending a command to the WMC server to remove a second inventory for the second inactive item from the second slot, and relocate the second inventory to a second temporary empty slot; and
- using replenishments generated by the WMC server to perform product relocation of new inventory for the second preferred item to the second slot as assigned in the slotting map.

11. The computer based method of claim 10 further comprising:
- repeating the step of querying the WMC server, the step of sending a command to the WMC server, and the step of using replenishments in the WMC server until no inactive items occupy slots that are needed for other items as listed in the slotting map.

12. The computer based method of claim 9, wherein inactive items are items that occupy slots for long periods of time before stock is depleted.

13. The computer based method of claim 9, wherein the inventory that is assigned to the temporary empty slot is automatically relocated to a proper non-temporary slot at a time that the assigned slots for those items from the slotting map become available.

14. The computer based method of claim 9, wherein a plurality of inactive items exist and the inactive item is selected from said plurality of inactive item that occupies a slot that has a highest priority item assigned to it in the slotting map.

15. The computer based method of claim 9, wherein a plurality of inactive items exist and the inactive item is randomly chosen from said plurality of inactive items if no priority ranking exists.

16. A computer based method for proactively relocating inactive items in a dynamic slotting environment to minimize blocking of required slots for items in a zone, the method comprising:
- querying a warehouse management control (WMC) server for a list of one or more items currently slotted into a first zone different than an assigned zone that is assigned to listed items in a slotting map that lists preferred slot assignments for the listed items, wherein the listed items are inactive items that are not being picked in a current pick cycle, wherein a slot in the slotting map is a physical storage location in the warehouse;
- sending a command to the WMC server to relocate stock for an inactive item of the listed items to an available slot in the assigned zone, wherein the available slot is a physical storage location in the warehouse; and
- repeating the sending step until each of the inactive items is relocated to the assigned zone, wherein blocking of required slots for items in a zone is minimized.

17. The computer based method of claim 16, wherein the list of one or more items is a priority listing of items, the priority indicating an order of items to be selected for relocation.

18. The computer based method of claim 16 further comprising:
- applying a rule to prioritize the one or more items into a prioritized listing of items, wherein the priority indicating an order of items to be selected for relocation.

19. The computer based method of claim 16, wherein the inactive items are not being picked due to a previous assignment different from assignment contained in the slotting map.

20. The computer based method of claim 16 further comprising:
- querying the WMC server for a second list of one or more items currently slotted into one or more zones, each of the one or more zones different than a zone assigned to the listed items in the slotting map, wherein the second listed items are currently inactive items that are not being picked in a current pick cycle;
- sending a command to the WMC server to relocate stock for a currently inactive item of the second listed items to an available slot in the zone assigned to that currently inactive item in the slotting map; and
- repeating the sending step until each of the currently inactive items are relocated to the assigned zone in the slotting map.

* * * * *

UNITED STATES PATENT AND TRADEMARK OFFICE
CERTIFICATE OF CORRECTION

| | | |
|---|---|---|
| PATENT NO. | : 9,613,335 B2 | Page 1 of 3 |
| APPLICATION NO. | : 14/560594 | |
| DATED | : April 4, 2017 | |
| INVENTOR(S) | : Charles Ray Grissom et al. | |

It is certified that error appears in the above-identified patent and that said Letters Patent is hereby corrected as shown below:

Column 1, Line 53: "A produces distribution" should be --A product's distribution--.

Column 20, Line 9: "obtaining from" should be --obtaining by a reslotting server from--.

Column 20, Line 9: "management control (WMC)" should be --management system (WMS)--.

Column 20, Line 15: "comparing the current" should be --comparing by the reslotting server the current--.

Column 20, Line 22: "command to the WMC server" should be --command from the reslotting server to the WMS server--.

Column 20, Line 25: "picking inventory remaining" should be --sending a pick inventory command from the reslotting server to the WMS server to pick inventory remaining--.

Column 20, Line 31: "determining when" should be --determining by the reslotting server when--.

Column 20, Line 33: "directing new" should be --directing the WMS server by the reslotting server to provide new--.

Column 20, Line 36: "picking the inventory of" should be --sending the pick inventory command for--.

Column 20, Lines 38-42: Claim 4, beginning "the computer based method of claim 3,..." and ending "...to initiate said picking." should be --claim 4 (canceled)--.

Column 20, Lines 45-46: "the WMC server to complete any picking step" should be --the WMS server by the reslotting server to complete any command to inventory pick step--.

Signed and Sealed this
Sixth Day of June, 2017

Michelle K. Lee
*Director of the United States Patent and Trademark Office*

CERTIFICATE OF CORRECTION (continued)
U.S. Pat. No. 9,613,335 B2

Column 20, Line 50: "determining that a second empty slot exits that" should be --determining by the reslotting server that a second empty slot exists that--.

Column 20, Lines 54-55: "the WMC server to replenish" should be --the WMS server by the reslotting server to replenish--.

Column 20, Line 59: "determining that" should be --determining by the reslotting server that--.

Column 20, Line 60: "determining whether" should be --determining by the reslotting server whether--.

Column 20, Line 65: "command to the WMC server" should be --command by the reslotting server to the WMS server--.

Column 21, Lines 7-8: "management control (WMC) server to find" should be --management system (WMS) server by a reslotting server to find--.

Column 21, Line 14: "command to the WMC server" should be --command by the reslotting server to the WMS server--.

Column 21, Lines 17-18: "using replenishments generated by the WMC server to perform product relocation of" should be --sending a replenishment command from the reslotting server to the WMS server to perform a replenishment of--.

Column 21, Lines 23-24: "managements control (WMC) server to find" should be --management system (WMS) server by the reslotting server to find--.

Column 21, Line 28: "command to the WMC server" should be --command by the reslotting server WMS server--.

Column 21, Lines 32-32: "using replenishments generated by the WMC server to perform product relocation of" should be --sending a replenishment command from the reslotting server to the WMS server to perform a replenishment of--.

Column 21, Lines 38-39: "the WMC server, the step of sending a command" should be --the WMS server by the reslotting server, the step of sending by the reslotting server a command--.

Column 21, Line 40: "using replenishments in the WMC server" should be --using sending a replenishment command sent from the reslotting server to the WMS server--.

Column 22, Lines 9-10: "management control (WMC) server for" should be --management system (WMS) server by a reslotting server for--.

Column 22, Line 19: "command to the WMC server" should be --command by the reslotting server to the WMS server--.

CERTIFICATE OF CORRECTION (continued)
U.S. Pat. No. 9,613,335 B2

Column 22, Line 33: "rule to prioritize" should be --rule by the reslotting server to prioritize--.

Column 22, Line 41: "the WMC server for a" should be --the WMS server by the reslotting server for a--.

Column 22, Line 47: "the WMC server to" should be --the WMS server by the reslotting server to--.